United States Patent [19]

Christison

[11] 4,062,160
[45] Dec. 13, 1977

[54] LATH HAVING SPIDER WEB-LIKE ELASTOMERIC BACKING

[75] Inventor: John M. Christison, Kinross, Scotland

[73] Assignee: The Expanded Metal Company Limited, London, England

[21] Appl. No.: 688,988

[22] Filed: May 24, 1976

Related U.S. Application Data

[63] Continuation of Ser. No. 569,453, April 18, 1975, abandoned.

[51] Int. Cl.² .......................... B32B 3/14; B32B 3/24; E04B 5/52; E04F 13/04
[52] U.S. Cl. ....................................... 52/445; 52/449; 52/454; 52/676; 428/255; 428/256
[58] Field of Search ................. 52/449, 454, 445, 676; 428/255, 256; 427/180

[56] References Cited

U.S. PATENT DOCUMENTS

| | | | |
|---|---|---|---|
| 1,824,082 | 9/1931 | Hernandez | 52/727 |
| 1,890,023 | 12/1932 | Schroder | 52/727 |
| 3,072,497 | 1/1963 | Guglielmo | 428/256 |

FOREIGN PATENT DOCUMENTS

| | | | |
|---|---|---|---|
| 1,560,776 | 2/1964 | Germany | 428/255 |
| 1,211,700 | 11/1970 | United Kingdom | 428/256 |

*Primary Examiner*—J.C. Cannon
*Attorney, Agent, or Firm*—McAulay, Fields, Fisher & Goldstein

[57] ABSTRACT

A metal mesh lath, which is capable of receiving a spray or projection rendering of a material such as plaster or mortar, is provided on its rear surface with a coating of a resilient adhesive, particularly an elastomer or resilient plastic, which is stuck to the metal mesh and forms an elastic membrane over the apertures of the mesh.

13 Claims, 7 Drawing Figures

LATH HAVING SPIDER WEB-LIKE ELASTOMERIC BACKING

CROSS REFERENCE TO RELATED APPLICATION

This application is a continuation of my copending application Ser. No. 569,453 filed Apr. 18, 1975 for "Lath" and now abandoned.

BACKGROUND OF THE INVENTION

One conventional method of forming a situ wall surfaces involves spraying or projecting plaster or mortar onto a mesh lath. A typical mesh lath is formed by expanded metal which may be reinforced with integrally rolled ribs.

When a mesh lath has plaster or mortar sprayed or projected onto it, the plaster or mortar envelopes the strands of the mesh and forms a continuous surface at least on the front of the lath. However, as much as 25% or more of the plaster or mortar would pass through the openings in the mesh and be wasted unless some backing is provided on the lath. It is known to provide such a backing in the form of a sheet of paper which is stapled, sewn, or bonded to the lath. The fixing of the sheet of paper to the lath is not an easy operation and the paper is liable to become torn during handling, particulary if it becomes wet.

It has been proposed, in British Specification No. 1,211,700, to apply to a mesh lath either globules of foamed synthetic resin or a flock coating. It is believed that these techniques have never been used commercially and they are quite impracticable. This is because neither the globules of foamed synthetic resin nor the flock fibres will project sufficiently across the apertures of the mesh to impede the plaster or mortar to any useful extent and the flock coating will be unacceptably expensive in requiring both the application of an adhesive and of staple fibre, usually in an electrostatic field. Further, the type of coating described will not expand in order to accept the correct amount of plaster as the plaster or mortar is directed against the coated mesh lath.

U.S. Pat. No. 3,072,497 - Guglielmo Sr., et al, describes the coating of open mesh materials, including metal laths. In particular, that patent is directed to a method of coating such a lath and the net result is a continuous coating of the plastic across both faces of the lath. In particular, this is shown by FIGS. 4 and 5 and their description which shows the solid portion of the lath to be covered, front and back, by the resin coating. Still further, that patent discloses at Column 4, in the paragraph beginning at line 49, that the viscosity of the coating material should be high so as to insure a continuous film. The structure resulting will not function in the same efficient way as the structure of the present invention.

BRIEF DESCRIPTION OF THE INVENTION

In accordance with the present invention, a metal mesh lath which is capable of receiving a spray or projection rendering of a material such as plaster or mortar, is provided on its rear surface with a resilient coating which can be formed from an elastomeric or synthetic plastic adhesive. This coating is stuck to the metal mesh and forms a membrane over the apertures of the mesh.

This new product is easily and cheaply produced by the application of a single component to the metal mesh, and it can be stored in the open as it does not suffer if it becomes wet and is not subject to mildew or infestation. The most surprising advantage, however, results from the thin elastic membrane across the apertures in the mesh. If if found that in practice a plaster or other rendering can be sprayed or projected onto the front of the lath and as the plaster passes through the apertures in the mesh, the elastic membrane contains the plaster but gives sufficiently under its own elasticity to allow the plaster to bulge through the apertures in the mesh and to key behind the strands of the mesh. The bond between the elastic membrane and the mesh may fail at isolated points and at other isolated points the membrane may fracture. However, the overall effect is that virtually all the plaster is contained and little or none is wasted. The rendering may of course be applied by hand trowelling and the membrane will even then reduce the wastage of plaster passing through the mesh apertures but the saving will not be as great as in the case of spray or projection plastering in which upwards of 25% of the plaster applied would otherwise be wasted.

A wide variety of resilient adhesives may be used, provide that they have the properties of forming a self-supporting, elastic membrane over a dimension of the order of 25mm. and of bonding to metal. Natural rubbers can be used, but synthetic rubbers such as butyl rubber, nitrile rubber, chlorinated rubber, chlorosulfonated polyethylene, fluoroelastomers, polysulfides, polyurethanes, and styrene butadienes, including ABS, can also be employed. A suitable membrane may be produced by coating the back of the lath with neoprene at a surface density of between 10 and 50 grams dry weight per square meter. However, the invention is not limited to the use of this type of elastomer and other plastic materials which have resilience can also be employed such as certain polyamides, certain polycarbonates, certain polyesters and the various vinyl compounds such as polyethylene, polypropylene, polyvinylidene chloride, polyvinyl dichloride, and polyvinyl chloride. The most preferred of these various materials for use in accordance with the present invention is polyvinyl chloride (PVC). It has been found that the natural and synthetic rubbers may lose some of their resiliency when stored outdoors, as is desirable in the case of the material of the present invention. The linking feature of the various materials referred to above is that they have elastomeric properties, i.e., that they are resilient or elastic in the form in which they are applied to the metal mesh so as to form the material of the present invention. The preferred PVC adheres well to the metal lath and the resulting membrane, though perhaps less resilient than a neoprene type material, has sufficient resilience to expand and contain the plaster or similar material during its application while avoiding the problems of aging of the neoprene-like materials.

The metal mesh is preferably an expanded steel sheet which may be galvanished. For a lath to be rendered, the apertures in the expanded mesh, irrespective of whether the apertures are lozenge shaped, parallelogram shaped, or another shape, will normally have a shorter dimension within the range of 5 to 20 mm. and a longer dimension within the range of 12 to 40 mm.

Depending upon the manner of application of the membrane-forming coating and surface density of the coating, the membrane may be continuous or discontinuous. However, any apertures through the membrane must be small enough for the rendering to be contained in use. A discontinuous membrane requires less adhesive and has the slight advantage that the openings in the membrane itself may provide some additional keying for the rendering, but the particular advantage is that the lath is not opaque and a workman can see through the lath for fixing of the lath. This discontinuous, cobweb-like coating is preferred.

One particularly suitable method of applying the coating is by spraying a solution of the elastomeric adhesive onto the metal mesh in such a way that, before the elastomeric adhesive comes into contact with the metal, the solvent evaporates sufficiently for the elastomeric adhesive to solidify partially but not sufficiently to prevent the elastomeric adhesive from bonding to the metal. When the semi-solid strands come into contact with the back of the metal mesh, the adhesive strands bond to the metal strands of the mesh and the membrane is formed across the apertures of the metal mesh by a combination of overlap, fusion and spreading of the adhesive strands across the apertures. It is generally unnecessary for so much adhesive to be applied that a completely continuous membrane is produced and the preferred result has the appearance of an elastic network or elastic irregular spider's web with most of the openings in the network closed by a thin film of the adhesive. Upon subsequent complete evaporation of the remaining solvent, the adhesive is found to contract so that the apertures in the membrane are approximately circular and of random sizes. This type of coating can easily be achieved with the preferred PVC, as well as most of the other elastomeric and plastic materials set forth.

After spraying the coated mesh may be left to dry so that the remaining slvent evaporates. However, this step is preferably accelerated by passing the coated mesh, immediately after spraying, through a heating chamber in which the remainder of the solvent is evaporated.

When employing PVC, for example, in order to obtain a cobweb-like membrane, it is necessary that the viscosity of the PVC solution is not too low otherwise the spray is too fine, and not too high otherwise it splatters. The viscosity limits for the solution are believed to be between 80 cps and 1000 cps, and preferably between 200 and 400 cps.

It is also necessary for the solvent blend to be controlled so that the strands which are formed upon partial evaporation of the solvent as the solution leaves the spray head, are sufficiently tacky to adhere to the mesh sheet or previously deposited material but not so wet as to dissolve the strands already laid down. Blends of ketone (e.g. acetone and methylethyl ketone) and aromatic solvents (e.g. toluene and xylene) have been found to be best for this purpose. The ratio of ketone: aromatic solvents may be in the range between 90:10 and 50:50, preferably between 75:25 and 65:35.

The total solids content of the solution may lie between 10 and 35%. Below 10% the viscosity is too low and above 35% there is a tendency for a gel to form. Preferably, the total solids content lies between 20 and 30%.

The vinyl content of the membrane formed on evaporation of the solvent should lie between 40 and 80% but preferably between 50 and 60%, the remainder being plasticisers and stabilisers.

The amount of material to be applied will depend on the amount of material necessary to bridge a given size of aperture in the mesh. In practice a deposit between 25 and 50 grams dry weight per square meter will be necessary and this can be achieved in a single pass using four spray guns.

BRIEF DESCRIPTION OF THE DRAWINGS

An example of a metal lath provided with an elastic membrane in accordance with the invention, together with apparatus for producing the lath are illustrated in the accompanying drawings in which.

DESCRIPTION OF THE PREFERRED EMBODIMENTS

Figure 1:
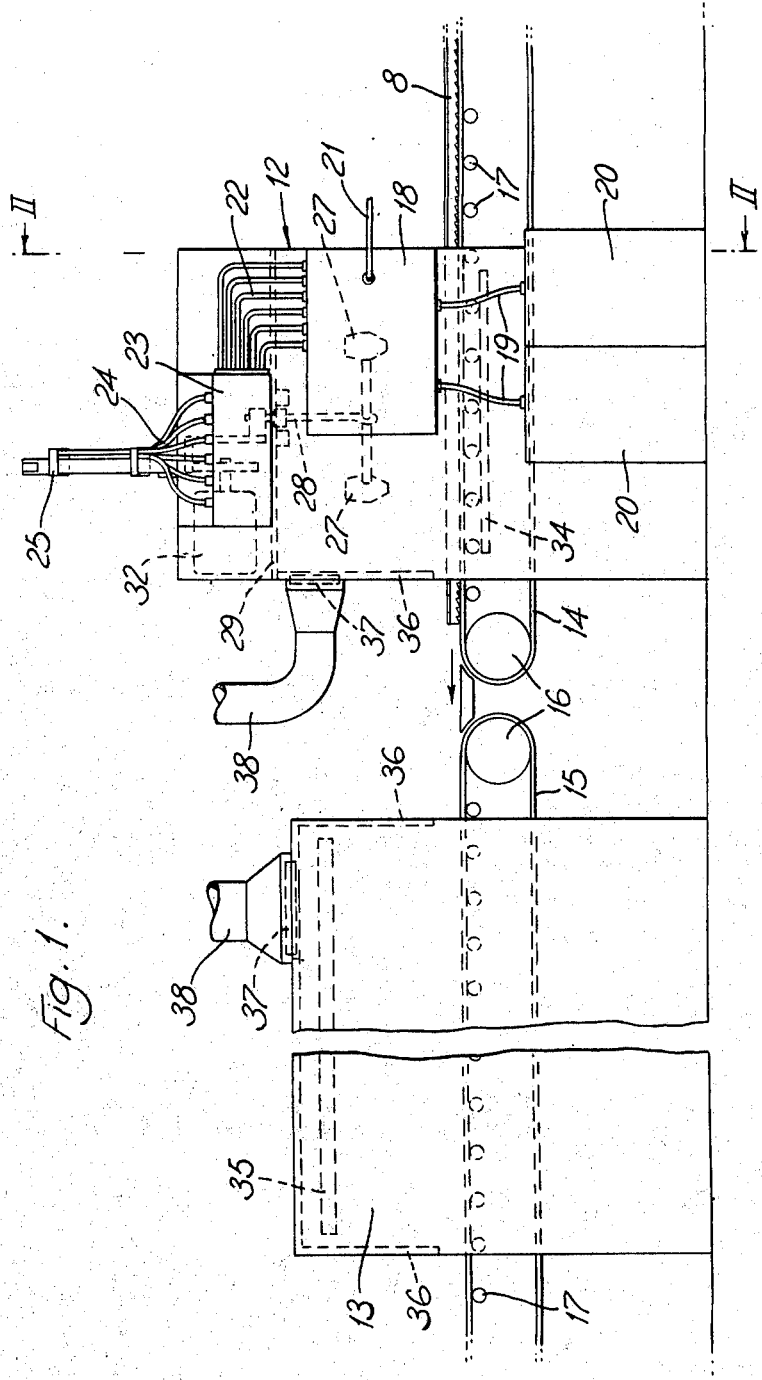
FIG. 1 is a diagrammatic side elevation of the apparatus.

The lath is basically a rectangular sheet 8 cut from a 20 thou thick tight coat galvanized steel sheet which has been expanded to produce substantially parallelogram shaped apertures 9 between metal strands 10, and subsequently rolled to produce parallel longitudinal ribs 11.

In order to apply the elastic membrane to the back of the metal mesh sheets they are conveyed in turn through a spraying chamber 12 and a drying chamber 13. The conveyance is by means of two endless belt conveyors 14 and 15 arranged end to end. Each conveyor consists of a number of parallel endless belts extending side by side and passing round pairs of end rollers 16 of which one of each pair is driven. The upper run of each conveyor, which supports the mesh sheet, run over idler rollers 17.

The controls for the spraying chamber are mounted in and on a control box 18 which is connected by suction pipes 19 to containers 20 of adhesive solution and through a line 21 to an 80 psi compressed air supply. From the box 18 six pipes 22 lead to a distribution box 23 from which six corresponding flexible hoses 24 are carried via an elbow linkage 25 and carriage 26 to a pair of spray heads 27 which are suspended from the carriage 26 by a frame 28. Three pipes 22 and hoses 24 lead to each spray head 27. Of each three, two pipes and hoses provide feed and return lines for recirculating solution from the control box 18 to the spray head and back, the recirculating fluid which is discharged from the corresponding spray head being made up by suction from one of the containers 20. The third pipe and hose of each three supplies compressed air to the corresponding spray head 27.

Figure 2:
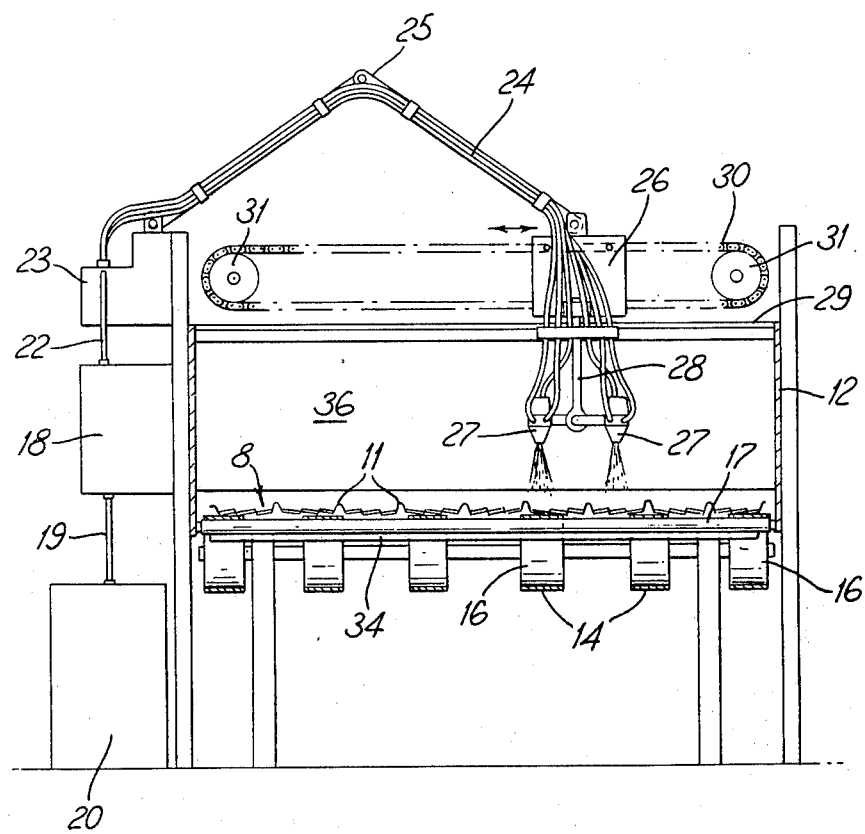
FIG. 2 is a diagrammatic section taken on the line II—II in FIG. 1.
Figure 3:
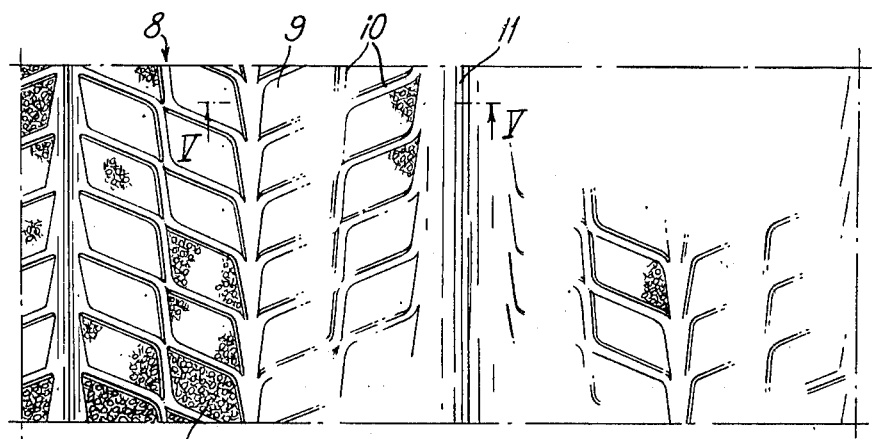
FIG. 3 is a front view of part of the lath.

The carriage 26 is guided to reciprocate to and fro across the chamber 12 above a sealing 29 which has a slot through which the frame 28 extends downwards. An endless chain 30, mounted on sprockets 31, of which one is driven by an electric motor 32, has a pin and abutment connection with the carriage 26 so that the carriage is first moved to the left in FIG. 2 to one side of the chamber 12 whereupon the pin on the upper run of the chain 30 passes out of engagement with the abutment on the carriage, round the left hand sprocket 31, and reengages another abutment on the carriage, to carry the carriage back to the right hand side of the chamber 12. The pin then disengages from the abutment, passes around the right hand sprocket 31, reengages the first abutment on the carriage 26, and carries the carriage 26 back to the left again. The spray heads 27, which are offset from one another in the direction of travel of the mesh sheet 8 through the chamber, thus continually pass to and fro over the sheet. The speed of reciprocation of the spray heads is related to the speed of the conveyors, which is about 16 feet per minute, such that the whole of the surface of the sheet 8 is sprayed. As the carriage 26 reciprocates to and fro, the elbow 25 closes and opens and the hoses 24 flex to allow the necessary carriage movement.

EXAMPLE 1

In this example a neoprene solution is employed, that solution being one sold by Bonding Systems (Sales) Limited under the name D.P.19/2 and consisting of ten parts by weight of polychloroprene rubber, one part by weight of phenolic resin, and seventy parts by weight of a blend of aliphatic and aromatic hydrocarbon solvents. The solution is heated in the box 18 and sprayed from the heads 27 under the force of the air pressure at a temperature of between 150° and 170° F. As the solution leaves the spray heads 27, there is a flash evaporation of a proportion of the solvents such that the neoprene partially solidifies into strands between the spray heads and the mesh sheet. As the strands impinge on the back of the mesh sheet they build up to form a coherent but discontinuous coating which sticks to the backs of the strands 10 and forms a membrane 33 stretched across the apertures 9. Any of the strands which should pass through the apertures 9 before sufficient build up occurs to produce the coherent coating, are caught by a catch plate 34 within the conveyor 14 beneath the spray heads 27.

The coated mesh sheet then passes onto the conveyor 15 and through the drying chamber 13 in which heat is directed into the upper face of the sheet from radiant heaters 35. The temperature in the drying chamber 13 is about 130° F and during passage through this chamber the remaining solvent is evaporated. The coated laths leaving the chamber 13 have a coating with a surface density of 18.5 grams dry weight per square meter, and are sufficiently dry so that they can then immediately be stacked on one another.

The entry and exit ends of the chambers 12 and 13 are closed by curtains 36 which retain the solvent vapour within the chambers, this vapour being extracted by fans 37 and ducts 38.

Figure 4:
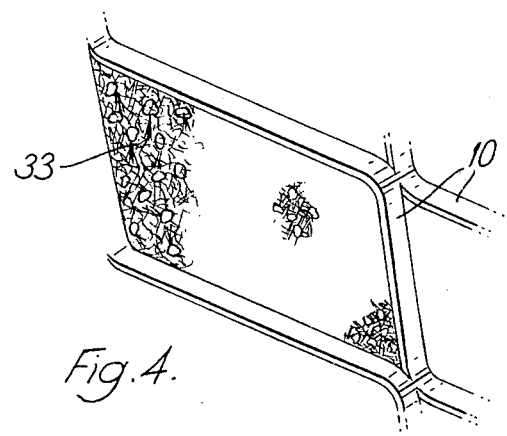
FIG. 4 is an enlarged view of one of the apertures in the lath.
Figure 5:
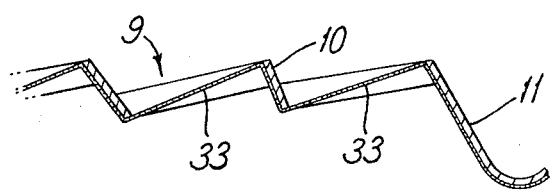
FIG. 5 is a section taken on the line V—V in FIG. 3.

The form of the resulting membranes 33 across the apertures 9 in the mesh may be understood from FIG. 4. As the strands of semi-solid elastomer impinge on the mesh and on one another to build up the coating, the discontinuous membrane across each aperture has basically the form of a network of elastic strands with the openings between the strands closed in most cases by a thin film with random generally circular holes where the strands meet one another. The resulting membrane has considerable strength and elasticity.

EXAMPLE 2

One example of the sprayable solution of PVC is that sold by Apollo Chemicals Limited under the name of Apollo A66. This solution has a total solids content of 25%, a viscosity of 250 cps, contains ketone and aromatic solvents in the ratio 66:34, and has a vinyl content when dry of 57%. When this solution is applied as in Example 1, under the same conditions, a similar film is formed.

Figure 6:
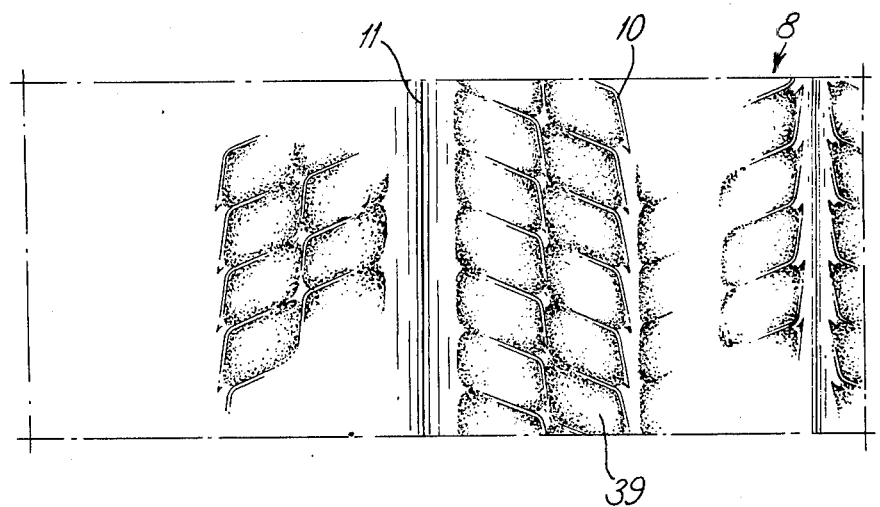
FIG. 6 is a rear view of part of the lath after plastering.
Figure 7:
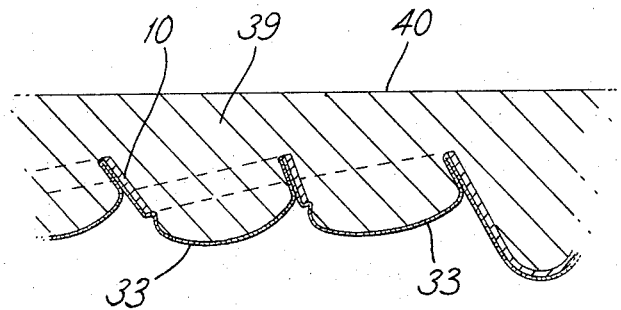
FIG. 7 is a view corresponding to FIG. 5 but showing the lath after plastering.

In use the lath is nailed to a structural support and a material such as plaster is applied to the front of the lath, preferably using a spray or projection gun which is moved over the surface of the lath. The plaster forces its way through the apertures 9 in the lath but is contained by the membrane 33. The membranes are not in general fractured but are able to stretch resiliently and to bulge out rearwardly. This promotes a lateral flow of the plaster parallel to the plane of the lath behind the strands 10. As a result a good key is provided between the plaster and the strands 10 and virtually none of the plaster passes right through the lath to be wasted. The resulting effect is shown in FIG. 6 and 7 where the plaster rendering is shown at 39, the front face 40 of the plaster having been smoothed off.

I claim:

1. A metal mesh lath which is adapted to receive a spray or projection rendering of a material such as plaster or mortar, said lath having a rear surface provided with a coating of an adhesive having elastomeric properties which is stuck to said metal mesh in the form of irregular spider web-like elastic strand membrane over the apertures of said mesh, whereby upon application of a rendering of said plaster or mortar onto the front of the lath, as the rendering passes through said apertures, said elastic strand membrane contains said rendering material, but, due to its elasticity, allows a portion of said rendering to pass through said apertures and to key behind said mesh.

2. A lath according to claim 1, wherein said membrane is discontinuous.

3. A lath according to claim 1, wherein said adhesive material having elastomeric properties is neoprene.

4. A lath according to claim 3, wherein said coating has a surface density of between 10 and 50 grams dry weight per square meter.

5. A lath according to claim 1, wherein said adhesive material having elastomeric properties is polyvinyl chloride.

6. A lath according to claim 5, wherein said coating has a surface density of between 25 and 50 grams dry weight per square meter.

7. A lath according to claim 1, wherein said metal mesh is expanded steel sheet.

8. A lath according to claim 7, wherein said expanded steel sheet is formed with parallel ribs.

9. A metal mesh lath which is capable of receiving a spray or projection rendering of a material such as plaster or mortar, said lath comprising an expanded metal sheet having apertures which are at least partially closed by an irregular spider web-like resilient membrane of strands of an adhesive material having elastomeric properties stuck to the rear surface of said expanded metal sheet said membrane having the structure produced by overlap and fusion and semi-solid strands of resilient adhesive sprayed towards said rear surface of the expanded metal sheet in solution with a voltaile solvent, whereby upon application of a rendering of said plaster or mortar onto the front of the lath, as the rendering passes through said apertures, said elastic strand membrane contains said rendering material, but, due to its elasticity, allows a portion of said rendering to pass through said apertures and to key behind said mesh.

10. A lath according to claim 9, wherein said adhesive material having elastomeric properties is neoprene.

11. A lath according to claim 10, wherein said coating is applied at a surface density of between 10 and 50 grams dry weight per square meter.

12. A lath according to claim 9, wherein said adhesive material having elastomeric properties is polyvinyl chloride is PVC.

13. A lath according to claim 12, wherein said coating is applied at a surface density of between 25 and 50 grams dry weight per square meter.

* * * * *

UNITED STATES PATENT AND TRADEMARK OFFICE
CERTIFICATE OF CORRECTION

PATENT NO. : 4,062,160
DATED : December 13, 1977
INVENTOR(S) : John M. Christison It is certified that error appears in the above-identified patent and that said Letters Patent are hereby corrected as shown below:

Col. 1, line 12 "a" should read --in--.

Col. 2, line 5 "If if" should read -- It is --.

Col. 3, line 34 "slvent" should read --solvent--.

Claim 1, Col. 6, line 22 after "adhesive" insert --material--.

Signed and Sealed this

Eighteenth Day of July 1978

[SEAL]

Attest:

RUTH C. MASON
Attesting Officer

DONALD W. BANNER
Commissioner of Patents and Trademarks